United States Patent [19]

Shinohara et al.

[11] Patent Number: 6,050,515

[45] Date of Patent: Apr. 18, 2000

[54] MAGNETIC TAPE WIND-UP DEVICE

[75] Inventors: Isao Shinohara, Ikoma; Yoshihiko Yamada, Kobe, both of Japan

[73] Assignee: Matsushita Electric Industrial Co., Ltd., Osaka, Japan

[21] Appl. No.: 08/987,776

[22] Filed: Dec. 9, 1997

[30] Foreign Application Priority Data

Dec. 25, 1996 [JP] Japan ................................. 8-345522

[51] Int. Cl.[7] ............................ G11B 15/32; G11B 5/008
[52] U.S. Cl. ........................................ 242/356.5; 360/96.3
[58] Field of Search ........................ 242/356.5; 360/96.3, 360/96.4

[56] References Cited

U.S. PATENT DOCUMENTS 5,003,418  3/1991  Yang ..................................... 242/356.5
5,308,016  5/1994  Saito et al. ............................ 242/356.5
5,758,839  6/1998  Kim ..................................... 242/356.5

*Primary Examiner*—John Q. Nguyen
*Attorney, Agent, or Firm*—Greenblum & Bernstein, P.L.C.

[57] ABSTRACT

A magnetic tape wind-up device designed to wind up a magnetic tape, which is fed at a constant speed by a capstan and a pinch roller, around a reel is provided with a slip mechanism having a drive slip gear (1) driven by a motor to rotate and a driven slip gear (2) which is in frictional engagement with and is driven to rotate by the drive slip gear (1) while slipping therewith, thereby to drive the reel to rotate. This slip mechanism is configured to be capable of reducing the mean slip torque by periodically changing slip torque, thereby making it possible to wind up a tape cassette having a high rotational load without trouble.

3 Claims, 14 Drawing Sheets

Fig. 9
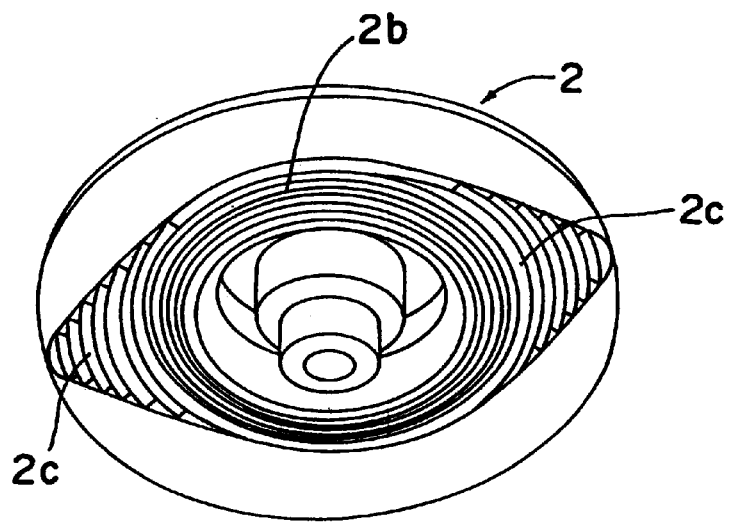
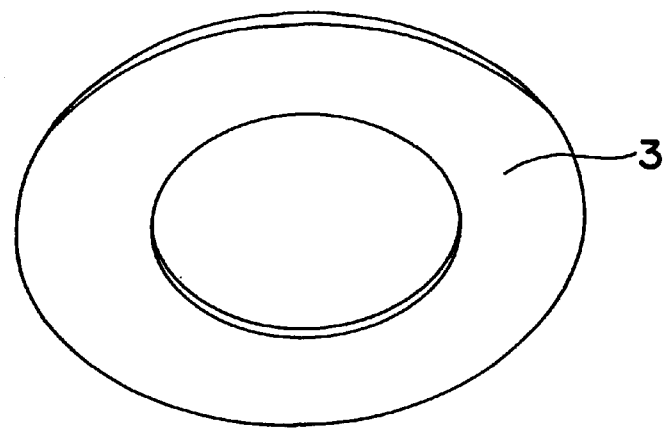
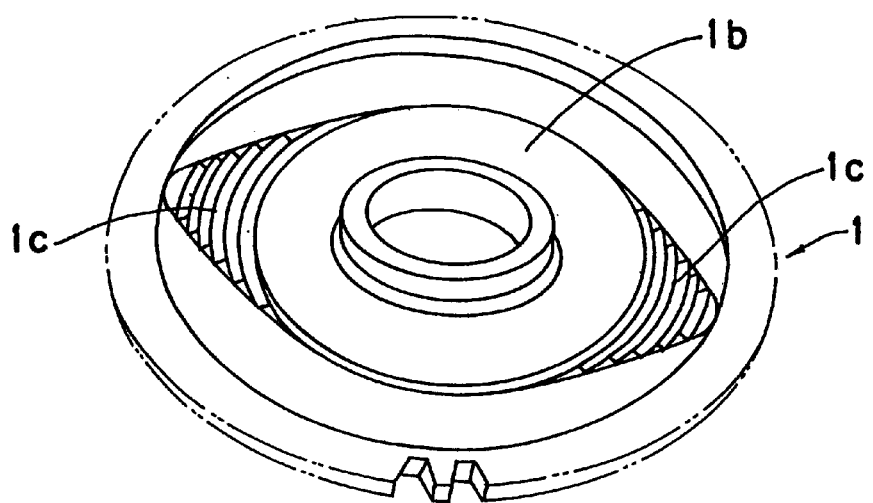

Reproduction run

Reel in idle

MAGNETIC TAPE WIND-UP DEVICE

FIELD OF THE INVENTION

The present invention relates to a magnetic tape wind-up device for tape recorders, video recording deck and the like.

DESCRIPTION OF THE PRIOR ART

Information recording and reproducing apparatuses employing magnetic tapes such as tape recorder and video recording deck generally have tape wind-up device which winds up magnetic tape fed at a constant speed by a capstan and a pinch roller around a reel installed therein, while the conventional tape wind-up device is made in such a configuration that a constant torque is generated at all times to drive the reel to rotate.

Specific construction of a magnetic tape wind-up device of the prior art will be described below.

FIG. 22 and FIG. 23 are vertical cross sectional view and plan view showing the configuration of the magnetic tape wind-up device of the prior art, respectively.

In FIG. 22 and FIG. 23, numeral 1 denotes a drive slip gear which is driven by a motor 6 (see FIG. 10). Numeral 2 denotes a driven slip gear which is arranged to rotate freely with respect to the drive slip gear 1. Numeral 3 denotes a slip member which is made of a fabric material in an annular (disk) shape and is arranged to be interposed by the drive slip gear 1 and the driven slip gear 2. Numeral 4 denotes a compressive spring formed in a shape of truncated cone, one end 4a of which is received by a spring receiver 5 which is pressed into the driven slip gear 2, and the other end 4b presses against the drive slip gear 1. The pressing force of the compressive spring 4 causes the slip member 3 to be pressed by a slipping surface 1a of the drive slip gear 1 and a slipping surface 2a of the driven slip gear 2 on both sides.

Thus when the drive slip gear 1 is driven to rotate by the motor 6 (see FIG. 10), the slipping surface 1a of the drive slip gear 1 or the slipping surface 2a of the driven slip gear 2 slips with respect to the slip member 3, thereby causing the drive slip gear 1 to transmit a constant torque (hereinafter called the slip torque) to the driven slip gear 2 and makes the driven slip gear 2 rotate in the same direction as that of the drive slip gear 1. And the driven slip gear 2 drives a first reel 15 or a second reel 18 to rotate by means of the slip torque, so that a magnetic tape 20 housed in a tape cassette 19 is wound up around a first reel hub 21 or a second reel hub 22 (see FIG. 10).

Configuration and operation of a rotation drive system of the magnetic tape wind-up device of the prior art are basically similar to the cases of embodiments of the present invention depicted in FIG. 10 through FIG. 15.

Recently information recording and reproducing apparatuses powered by batteries, namely tape recorder (particularly portable tape recorder) and the like for example, are required to operate for longer period of time on a battery, which in turn makes it necessary to reduce the load on the motor as small as possible. Thus a magnetic tape wind-up device is also required to keep the load imposed by the slip torque on the motor as low as possible. When the reel winding torque generated by the slip torque is less than the rotational load of the reel hub of the tape cassette, however, it becomes impossible to wind up the magnetic tape leading to such a problem as the magnetic tape is wrapped around a capstan or a pinch roller and is therefore stuck. Thus in the magnetic tape wind-up device of the prior art where the slip torque remains always constant, slip torque must be set to such a level that the reel winding torque generated by the slip torque is greater than the rotational load of the reel hub of the tape cassette of any types which are commercially available.

In actuality, however, because tape cassettes having a rotational load of reel hub as great as to make it impossible to wind up the tape are hardly encountered, setting the slip torque to accommodate any types of tape cassette causes the magnetic tape to be wound up with an excessively high slip torque for normal tape cassettes which account for most of the available tape cassettes, leading to wasteful consumption of the motor power, namely the battery power.

SUMMARY OF THE INVENTION

The present invention has been made to solve the problems of the prior art as described above, and an object of the present invention is to provide a magnetic tape wind-up device which is capable of winding up the magnetic tape of normal tape cassettes having relatively low rotational torque of the reel hub, with a relatively low slip torque, and is also capable of winding up the magnetic tape of tape cassettes having exceptionally high rotational torque of the reel hub without trouble.

First aspect of the present invention conceived to solve the above problems is a magnetic tape wind-up device for winding up magnetic tape which is fed at a constant speed by a capstan and a pinch roller around a reel, including a slip mechanism which has a drive member driven by a motor to rotate and a driven member that is driven to rotate by torque transmitted by the drive member through frictional engagement with the drive member while slipping against the drive member and drives the reel to rotate, and a torque controller which periodically changes the torque.

In this magnetic tape wind-up device, when the minimum level of the periodically changing slip torque is set to such a value that is just capable of winding up the magnetic tape of normal tape cassettes having relatively low rotational load of the reel hub, and the maximum level thereof is set to such a value that is just capable of winding up the magnetic tape of tape cassettes having exceptionally high rotational load of the reel hub, motor load for generating the slip torque can be substantially reduced and the magnetic tape of tape cassettes having exceptionally high rotational load of the reel hub can be wound up without trouble. That is, motor load for generating the slip torque becomes higher in the magnetic tape wind-up device of the prior art because the slip torque is always set to the maximum value. In the magnetic tape wind-up device of the present invention, on the other hand, motor load for generating the slip torque can be substantially reduced because average slip torque is substantially lower than the maximum value.

Also in this case, because the minimum value of slip torque is set to such a value that is just capable of winding up the magnetic tape of normal tape cassettes, it is a matter of course that magnetic tape of normal tape cassettes can be wound up without any trouble. On the other hand, because the maximum value of slip torque is set to such a value that is just capable of winding up the magnetic tape of tape cassettes having exceptionally high rotating torque of the reel hub, even when the magnetic tape of such a tape cassette cannot be properly wound up due to insufficient slip torque, the magnetic tape can be surely wound up at a later time when the slip torque reaches the maximum value. When the reel hub stops due to an excessive rotational load with an insufficient slip torque, relative rotational speed of the drive member and the driven member increases and the period of slip torque variation becomes very short, and therefore the slip torque reaches the maximum value in a very short period of time thereafter. Thus the high slip torque makes the reel hub surely driven to rotate, without such troubles as the magnetic tape being wrapped around the capstan or the pinch roller and stuck.

Second aspect of the present invention is the magnetic tape wind-up device according to the first aspect, wherein the torque controller includes a first slipping portion where the drive member and the driven member are engaged to each other with a constant degree of frictional engagement thereby to transmit a constant torque from the drive member to the driven member, and a second slipping portion where the drive member and the driven member are intermittently engaged to each other in frictional engagement thereby to intermittently transmit torque from the drive member to the driven member, while the constant torque and the intermittent torque are combined (caused to cooperate) so that the torque transmitted from the drive member to the driven member varies periodically.

In this magnetic tape wind-up device, provided that the degree of frictional engagement of the first slipping portion is set to such a value that is just capable of winding up the magnetic tape of a normal tape cassette with the transmitted torque of the first slipping portion and the degree of frictional engagement of the second slipping portion is set to such a value that is just capable of winding up the magnetic tape of a tape cassette having an exceptionally high rotational load of the reel hub by means of both the transmitted torque of the second slipping portion and the transmitted torque of the first slipping portion, motor load used in generating the slip torque can be greatly reduced and the magnetic tape of tape cassette having exceptionally high rotational load of the reel hub can be wound up without trouble.

In the magnetic tape wind-up device according to the second aspect of the present invention, the first slipping portion preferably includes a ring-shaped drive-side first slipping surface formed on the drive member and a ring-shaped driven-side first slipping surface which is formed on the driven member and engages with the drive-side first slipping surface with a constant degree of frictional engagement while slipping against the drive-side first slipping surface, and the second slipping portion preferably includes a drive-side second slipping surface formed on the drive member in such a way as to contact a part of the periphery of the drive-side first slipping surface, and a driven-side second slipping surface which is formed on the driven member in such a way as to contact a part of the periphery of the driven-side first slipping surface and intermittently makes frictional engagement with the drive-side second slipping surface as the drive member and the driven member rotate.

With this configuration, a constant slip torque is always generated by the drive-side first slipping surface and the driven-side first slipping surface, while intermittent slip torque is generated by the drive-side second slipping surface and the driven-side second slipping surface, so that periodically changing slip torque can be obtained through the cooperation of these slip torques. Thus motor load used in generating the slip torque can be greatly reduced with an extremely simple configuration, and the magnetic tape of a tape cassette having an exceptionally high rotational load of the reel hub can be wound up without trouble.

In this case, it is further preferable that the drive-side second slipping surface and the driven-side second slipping surface be formed in such configurations that become narrower (decrease) toward the outside in the radial direction. When configured in this way, sudden changes in the degree of frictional engagement do not occur when the driveside second slipping surface and the driven-side second slipping surface initiate frictional engagement periodically or when the frictional engagement is released, and therefore sudden changes in the slip torque do not occur and such troubles as wow (load variation) can be prevented from occurring.

In this magnetic tape wind-up device, it is further preferable that the drive-side first slipping surface be a flat surface, the driven-side first slipping surface have protruding and recessed circular tracks alternately formed thereon concentrically around the center of rotation of the driven member, the drive-side second slipping surface have protruding and recessed circular tracks alternately formed thereon concentrically around the center of rotation of the drive member, and the driven-side second slipping surface have protruding and recessed circular tracks alternately formed thereon concentrically around the center of rotation of the driven member so that the protruding and recessed tracks engage with the recessed and the protruding tracks of the drive-side second slipping surface, respectively, while a disk-shaped (annular-shaped) slip member be interposed between the drive member and the driven member in such a way as the surface on one side is in contact with the first slipping surface and the second slipping surface on the drive side and the surface on the other side is in contact with the first slipping surface and the second slipping surface on the driven side.

When configured in this way, it is made easier to set or control the degree of frictional engagement between the slipping surface on the drive member side and the slipping surface on the driven member side, namely the torque transmitting characteristic of both slipping portions.

In the magnetic tape wind-up device of the second aspect of the present invention, it is also preferable that the first slipping portion comprises a ring-shaped drive-side first slipping surface formed on the drive member and a ring-shaped driven-side first slipping surface which is formed on the driven member and engages with the drive-side first slipping surface with a constant degree of frictional engagement while slipping against the drive-side first slipping surface, and the second slipping portion comprises a side wall which has a concave cam surface and is formed on the drive member to surround the periphery of the drive-side first slipping surface, and a contact portion which is attached on the periphery of the driven-side first slipping surface and is elastically charged against the side wall thereby to make frictional engagement with the side wall when put into contact with the cam surface as the drive member and the driven member rotate.

With this configuration, a constant slip torque is always generated by the drive-side first slipping surface and the driven-side first slipping surface, while intermittent slip torque is generated by the contact portion of the driven member and the cam surface of the drive member, so that periodically changing slip torque can be obtained through the cooperation of these slip torques. Thus motor load used in generating the slip torque can be greatly reduced with an extremely simple configuration, and the magnetic tape of a tape cassette having an exceptionally high rotational load of the reel hub can be wound up without trouble.

In this magnetic tape wind-up device, it is further preferable that the drive-side first slipping surface be a flat surface, the driven-side first slipping surface have protruding and recessed circular tracks alternately formed thereon concentrically around the center of rotation of the driven member, and a disk-shaped slip member be interposed between the drive member and the driven member in such a way as the surface on one side is in contact with the first slipping surface on the drive side and the surface on the other side is in contact with the first slipping surface o n the driven side.

When configured in this way, it is made easier to set or control the degree of frictional engagement between the drive-side first slipping surface and the driven-side first slipping surface, namely the torque transmitting characteristic of the first slipping portion.

BRIEF DESCRIPTION OF THE DRAWINGS

These and other objects, features and advantages of the present invention will become clear from the following description taken in conjunction with the preferred embodiments with reference to the accompanying drawings throughout which like parts are designated by like reference numerals, and in which:

FIG. 9 is an oblique view of the slip mechanism shown in FIG. 1 being disassembled;

DETAILED DESCRIPTION OF THE PREFERRED EMBODIMENTS

The mode for carrying out the present invention will now be described in detail below. Although description of the embodiments that follows takes a magnetic tape wind-up device for tape recorders as an example, the present invention is not limited to magnetic tape wind-up devices of tape recorders and can be applied widely to magnetic tape wind-up devices of various information recording and reproducing apparatuses (for example, video recording deck) which use magnetic tape as the recording medium.

(Embodiment 1)

Taking reference to FIG. 1 through FIG. 17, Embodiment 1 will be described below.

Figure 1:
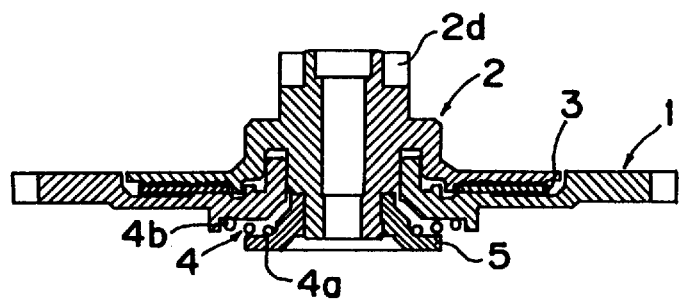
FIG. 1 is a vertical cross sectional view of the slip mechanism of the magnetic tape wind-up device according to Embodiment 1 of the present invention, in a state where the drive-side first slipping surface and the driven-side first slipping surface do not overlap each other.
Figure 2:
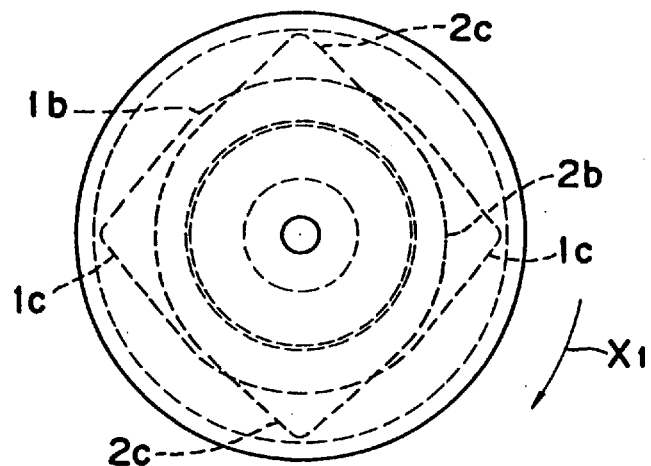
FIG. 2 is a plan view of a key portion of the slip mechanism shown in FIG. 1.
Figure 3:
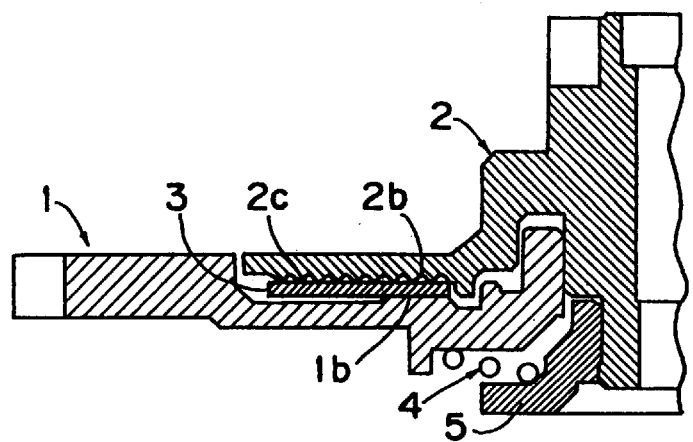
FIG. 3 is an enlarged vertical cross sectional view of a part of the slip mechanism shown in FIG. 1.

FIG. 1 is a vertical cross sectional view of a slip mechanism of a magnetic tape wind-up device according to Embodiment 1 of the present invention for tape recorders, in a state where the drive-side second slipping surface and the driven-side second slipping surface are not in frictional engagement with each other. FIG. 2 is a plan view of a key portion of the slip mechanism in the state of FIG. 1, and FIG. 3 is an enlarged view of a part (half) of the slip mechanism in the state of FIG. 1.

Figure 4:
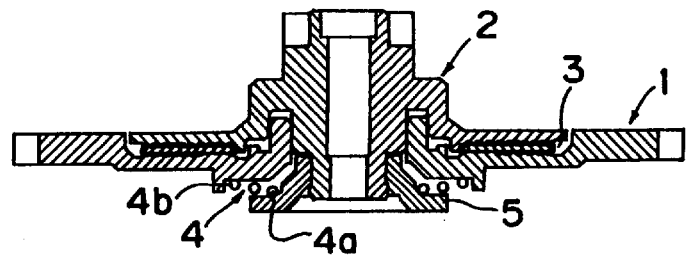
FIG. 4 is a vertical cross sectional view of the slip mechanism shown in FIG. 1, in a state where the drive-side second slipping surface and the driven-side second slipping surface are completely overlapped with each other.
Figure 5:
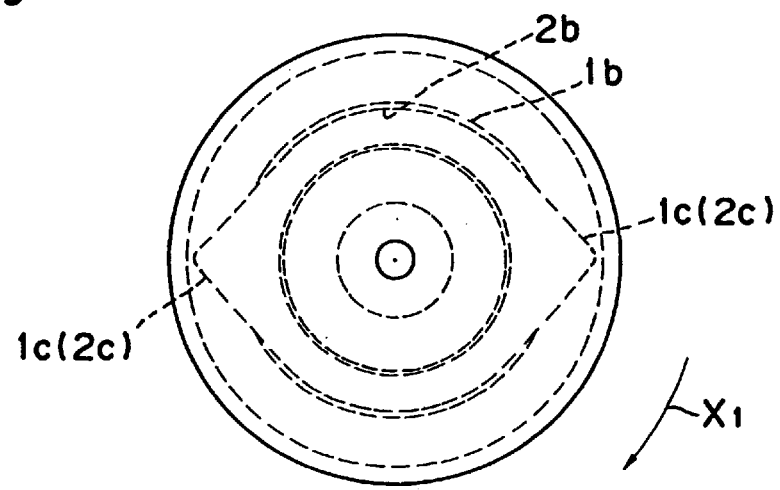
FIG. 5 is a plan view of a key portion of the slip mechanism shown in FIG. 4.
Figure 6:
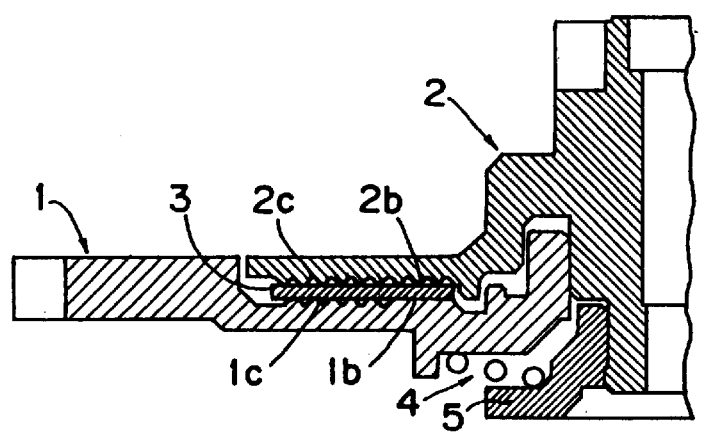
FIG. 6 is an enlarged vertical cross sectional view of a part of the slip mechanism shown in FIG. 4.

FIG. 4 shows the slip mechanism in a state where the drive-side second slipping surface and the driven-side second slipping surface are in frictional engagement with each other via the slip member. FIG. 5 is a plan view of a key portion of the slip mechanism in the state of FIG. 4, and FIG. 6 is an enlarged view of a part (half) of the slip mechanism in the state of FIG. 4.

Figure 7:
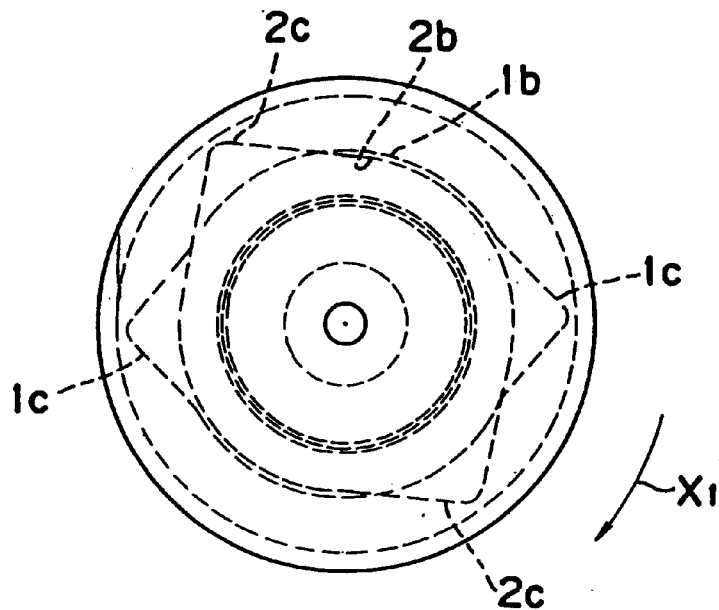
FIG. 7 is a plan view of the slip mechanism shown in FIG. 1, in a state of the drive-side second slipping surface and the driven-side second slipping surface starting to overlap each other.
Figure 8:
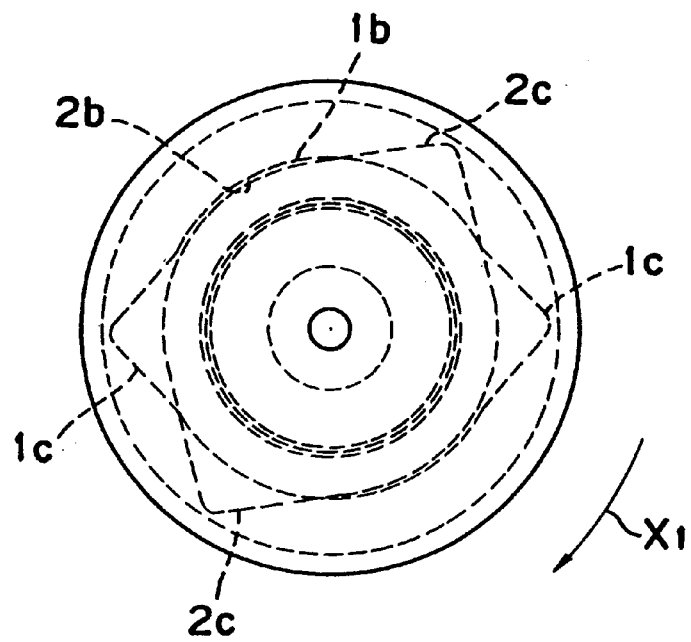
FIG. 8 is a plan view of the slip mechanism shown in FIG. 1, in a state of the drive-side second slipping surface and the driven-side second slipping surface completing to overlap each other.

FIG. 7 and FIG. 8 are plan views of a key portion of the slip mechanism when positional relationship of the drive-side second slipping surface and the driven-side second slipping surface falls between the state shown in FIG. 1 and the state shown in FIG. 4.

FIG. 9 is an oblique view of the slip mechanism being disassembled.

In FIG. 1 through FIG. 9, numeral 1 denotes a drive slip gear which is formed in a substantially disk shape with a gear being integrally formed in the periphery thereof. Numeral 2 denotes a driven slip gear which is formed in a substantially disk shape and is arranged to be freely rotatable with respect to the drive slip gear 1. A cylindrical portion near the center of the driven slip gear 2 has a gear 2d being integrally formed thereon. Numeral 3 denotes a slip member made of a fabric material (for example non-woven fabric) in a disk or annular shape. And the slip member 3 is arranged to be interposed between the drive slip gear 1 and the driven slip gear 2. Numeral 4 denotes a compressive spring formed in a shape of truncated cone, with one end 4a thereof being received by a spring receiver 5 which is pressed into the driven slip gear 2, and the other end 4b being pressed against the drive slip gear 1. The pressing force of the compressive spring 4 causes the slip member 3 to be interposed by the slipping surfaces 1b, 1c of the drive slip gear 1 and the slipping surfaces 2b, 2c of the driven slip gear 2 being pressed thereby.

The slipping surface of the drive slip gear 1 comprises the drive-side first slipping surface 1b formed in a ring shape around the center of rotation of the drive slip gear 1 at a position corresponding to a portion on the inner circumference of the slip member 3, and a pair of drive-side second slipping surface 1c which adjoin the periphery of the drive-side first slipping surface 1b and are formed at two mutually centrosymmetrical positions with respect to the center of rotation. The drive-side first slipping surface 1b is made in a flat surface. The drive-side second slipping surface 1c is formed in a configuration which gradually becomes narrower (decreases) toward the outside in the radial direction of the drive slip gear 1. And the drive-side second slipping surface 1c has a plurality of ridges (protruding tracks) and grooves (recessed tracks) alternately formed concentrically around the center of rotation of the drive slip gear 1. That is, the drive-side second slipping surface 1c has undulating cross section, and has ridges and grooves arranged concentrically around the center of rotation in plan view. The ridges on the drive-side second slipping surface 1c are formed to be higher toward the slip member 3 than the drive-side first slipping surface 1b, as can be seen from FIG. 6.

The slip surface of the driven slip gear 2 includes the driven-side first slipping surface 2b formed in a ring shape around the center of rotation of the driven slip gear 2 at a position corresponding to a portion on the inner circumference of the slip member 3, and a pair of driven-side second slipping surfaces 2c which adjoin the periphery of the driven-side first slipping surface 2b and are formed at two mutually centrosymmetrical positions with respect to the center of rotation. The driven-side second slipping surface 2c becomes narrower (decreases) toward the outside in the radial direction of the driven slip gear 2. And the driven-side first slipping surface 2b and the driven-side second slipping surfaces 2c each have a plurality of ridges (protruding tracks) and grooves (recessed tracks) alternately formed concentrically around the center of rotation of the driven slip gear 2. That is, the driven-side first slipping surface 2b and the driven-side second slipping surface 2c have undulating cross sections, and have ridges and grooves arranged concentrically around the center of rotation in plan view. The drive-side second slipping surface 1c and the driven-side second slipping surface 2c are arranged in such a positional relationship as the ridges of the drive-side second slipping surface 1c and the grooves of the driven-side second slipping surface 2c are engaged to each other, while the grooves of the drive-side second slipping surface 1c and the ridges of the driven-side second slipping surface 2c are engaged to each other.

With this configuration, because both slip surfaces 2b, 2c of the driven slip gear 2 come into mesh with the slip member 3, slipping motion occurs between the slip member 3 and both slipping surfaces 1b, 1c of the drive slip gear 1.

In this configuration, the drive-side first slipping surface 1b and the driven-side first slipping surface 2b always press the slip member 3 which is interposed therebetween, and thereby generate a constant slip torque (hereinafter referred to as "steady slip torque"). On the other hand, the drive-side second slipping surface 1c and the driven-side second slipping surface 2c overlap each other every time the drive slip gear 1 makes a half revolution relative to the driven slip gear 2, and interpose the slip member 3 therebetween during the period of overlap thereby to generate intermittent torque. Consequently, when the drive slip gear 1 rotates in relation to the driven slip gear 2 in the direction of arrow $X_1$ (see FIG. 2, FIG. 5, FIG. 7 and FIG. 8), cooperation of the steady slip torque and the intermittent slip torque generates periodically changing slip torque. That is, the driven slip gear 2 rotates in the direction of arrow $X_1$ at a rotational speed slower than the drive slip gear 1 while slipping against the drive slip gear 1, being accompanied by a slip torque.

As described above, the drive-side second slipping surface 1c is formed in such a configuration as the ridges thereof are slightly higher than the drive-side first slipping surface 1b in the direction of the slip member 3, and the circular ridges on the drive-side second slipping surface 1c engage with the circular grooves in the driven-side second slipping surface 2c, and therefore the ridges of the drive-side second slipping surface 1c come into mesh with the slip member 3 thereby surely generating a torque.

Now taking reference to FIG. 10 through FIG. 15, the slip mechanism or a drive mechanism of the magnetic tape wind-up device will be described below. Description that follows assumes that the tape recorder is in idle state in FIG. 10, at the start of forward reproduction (start of winding up) in FIG. 11, at the end of forward reproduction (end of winding up) in FIG. 12, at the start of reverse reproduction (start of winding up) in FIG. 13, in first fast feed state in FIG. 14 and in second fast feed state in FIG. 15.

As shown in FIG. 10 through FIG. 15, the drive slip gear 1 receives the rotation of the motor 6 transmitted via a first belt 7, a second fly wheel 8, a relay pulley gear 9, a relay gear 10 and a minor gear 10a of the relay gear 10 sequentially, while the drive slip gear 1 rotates at a constant speed when the magnetic tape runs for reproduction or the like.

Figure 11:
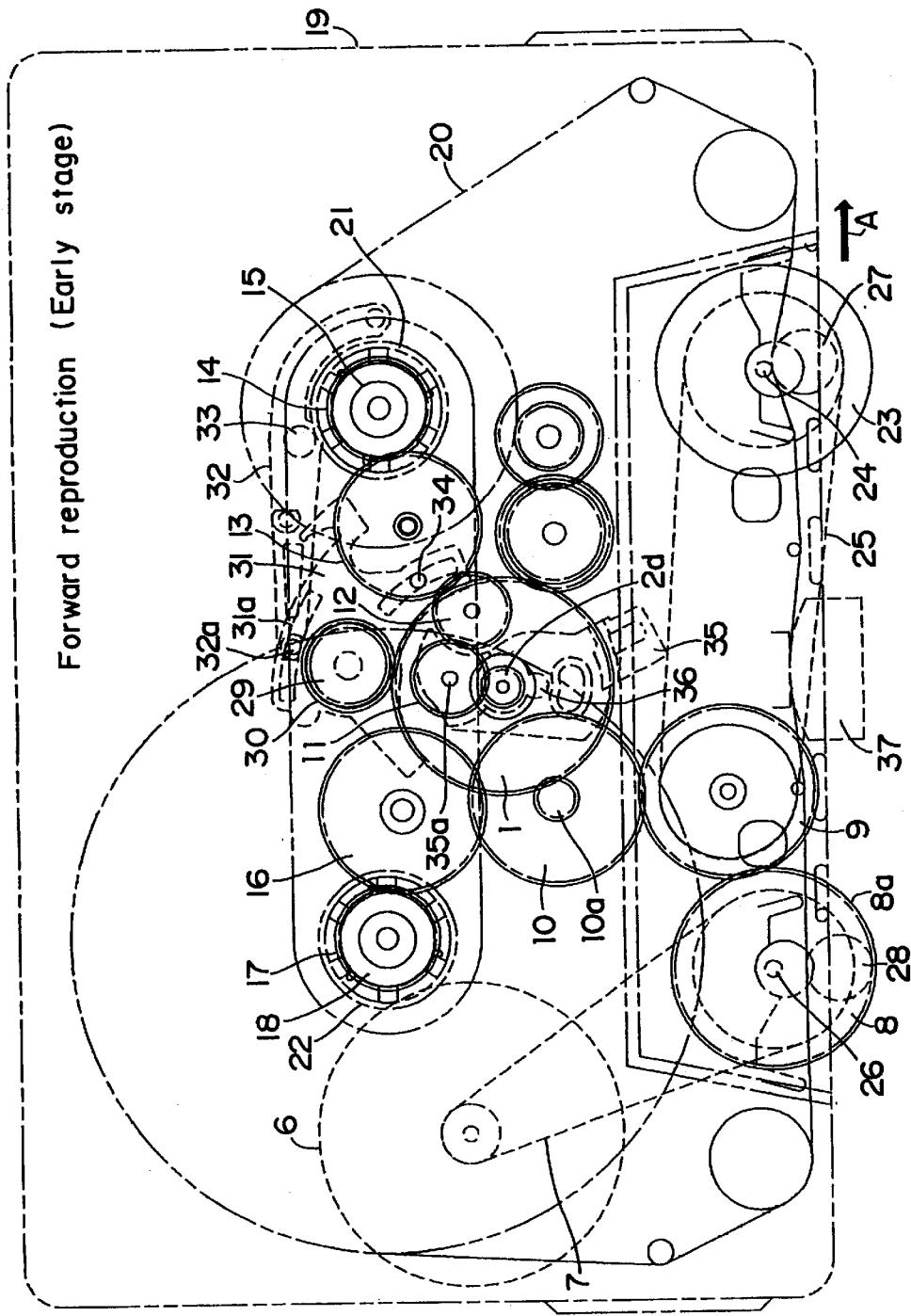
FIG. 11 is a schematic plan view of the tape recorder shown in FIG. 10 in a state of forward reproduction at the start of winding up magnetic tape.
Figure 12:
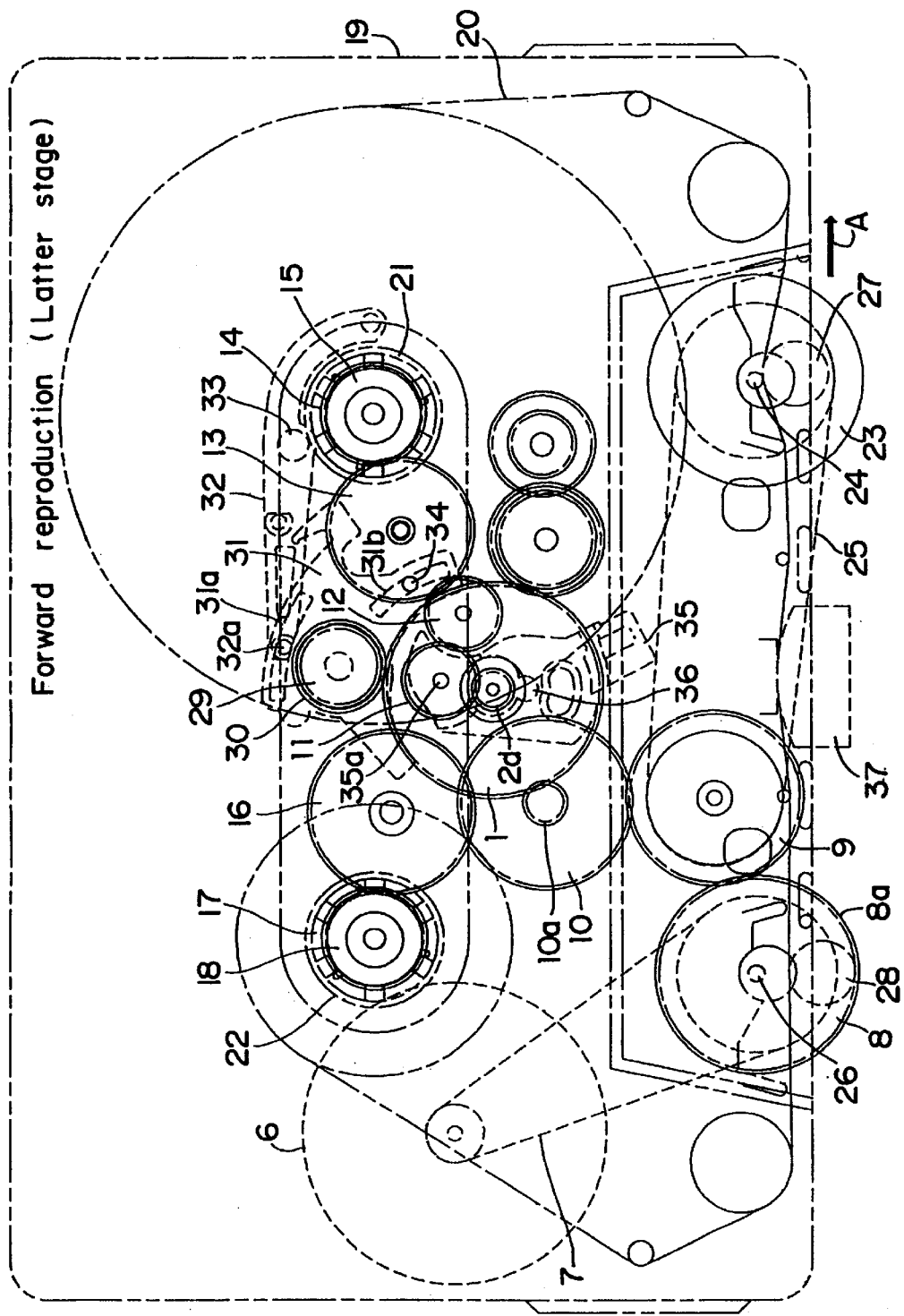
FIG. 12 is a schematic plan view of the tape recorder shown in FIG. 10 in a state of forward reproduction at the end of winding up magnetic tape.

During forward reproduction, rotation of the driven slip gear 2 accompanied by slip torque is transmitted via a gear 2d which is formed integrally with the driven slip gear 2, a play gear 11, an intermediate gear 12, a first reel relay gear 13 and a first reel gear 14, to a first reel 15 sequentially, as shown in FIG. 11 and FIG. 12.

Figure 13:
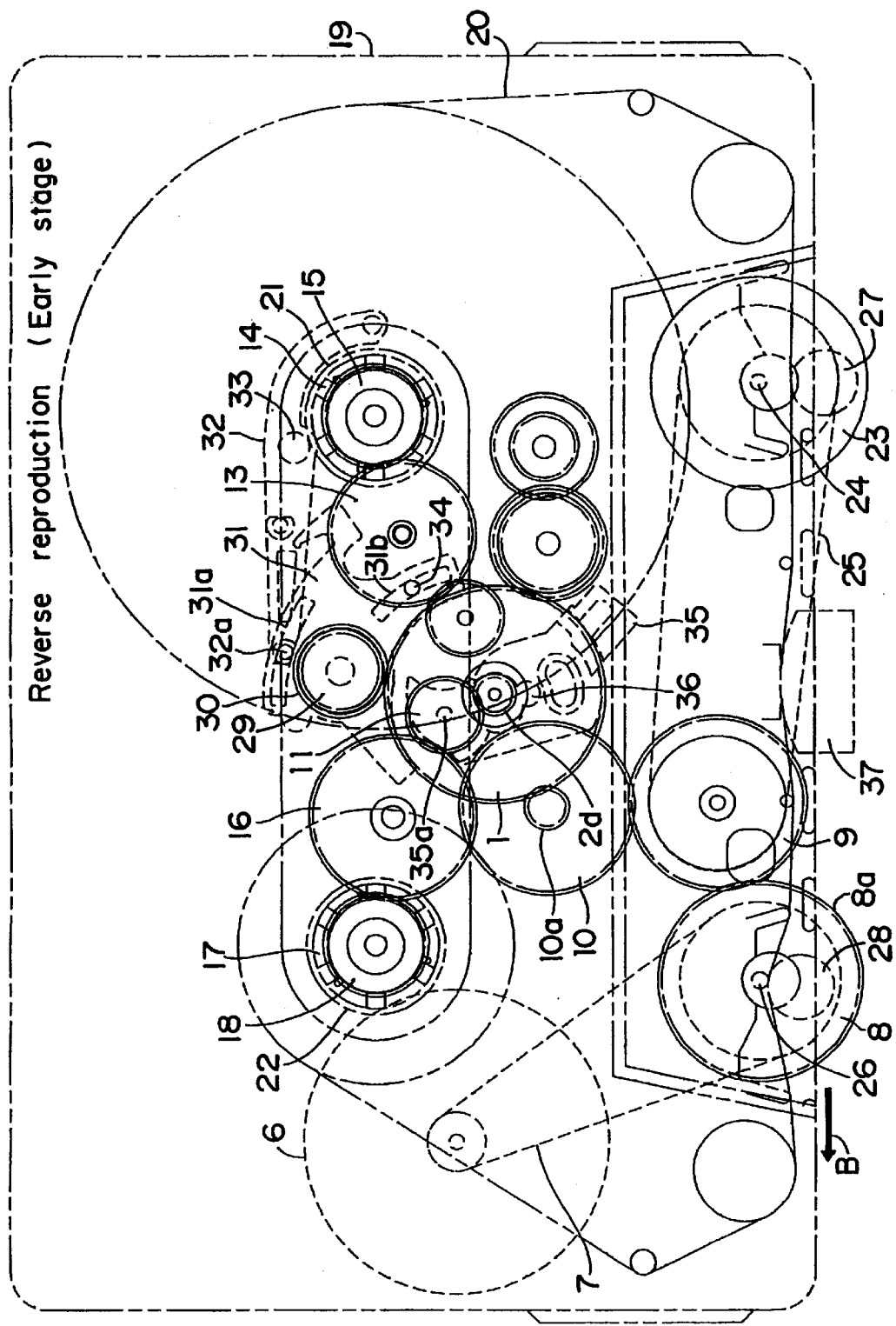
FIG. 13 is a schematic plan view of the tape recorder shown in FIG. 10 in a state of reverse reproduction at the start of winding up magnetic tape.
Figure 14:
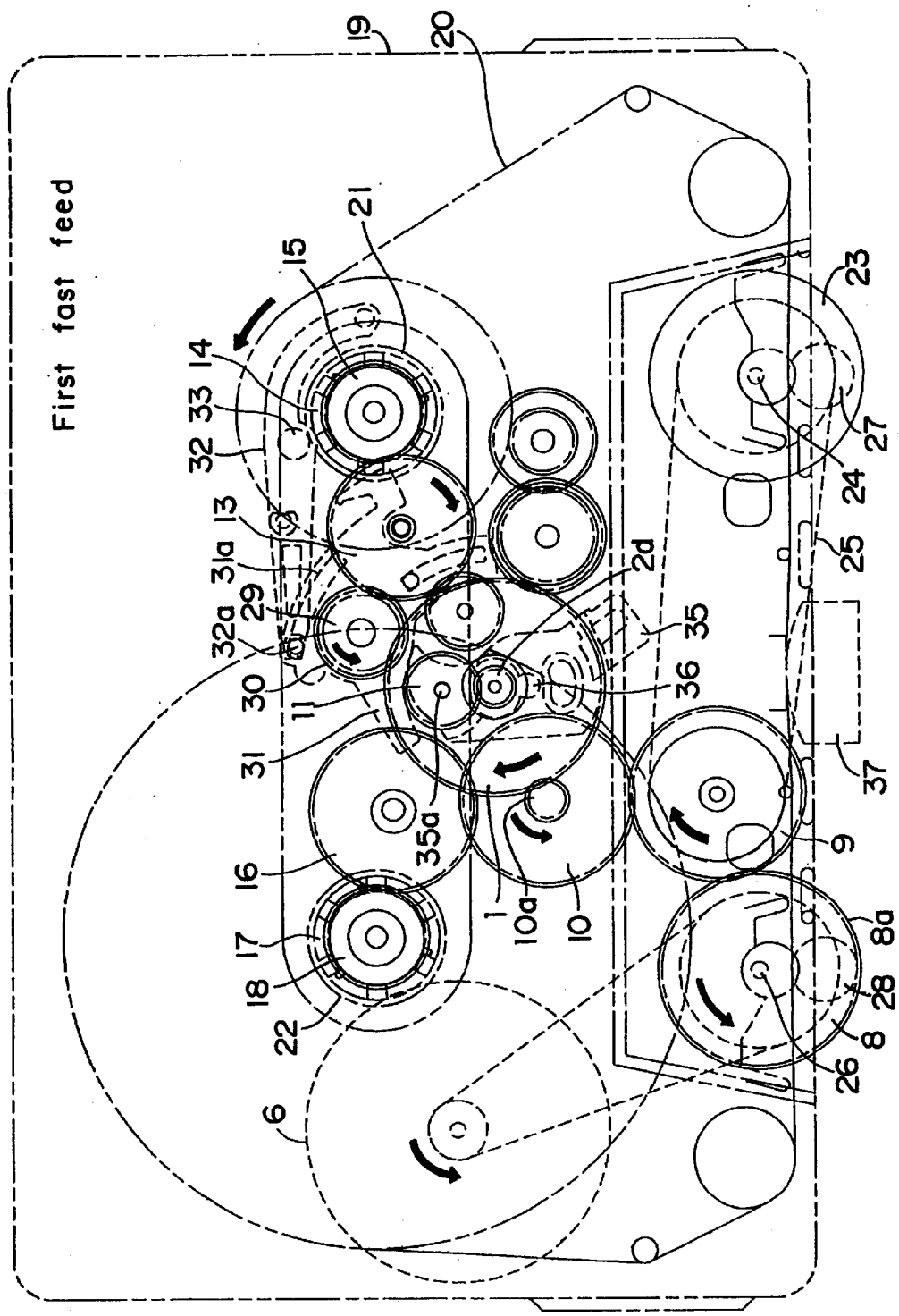
FIG. 14 is a schematic plan view of the tape recorder shown in FIG. 10 in a state of first fast feed operation.

During reverse reproduction, rotation of the driven slip gear 2 is transmitted via the gear 2d, the play gear 11, a second reel relay gear 16 and a second reel gear 17, to a second reel 18, as shown in FIG. 13.

Thus during forward reproduction or reverse reproduction, the magnetic tape 20 housed in the tape cassette 19 is fed in direction A or direction B and is wound up by a first reel hub 21 or a second reel hub 22, respectively.

In FIG. 10 through FIG. 15, numeral 23 denotes a first fly wheel which is supported by a bearing (not shown) to be freely rotatable, with a first capstan 24 being attached at the center of the first fly wheel 23 to rotate together with the first fly wheel 23 as one body. The first fly wheel 23 is driven to rotate by the relay pulley gear 9 via a second belt 25.

Numeral 26 denotes a second capstan attached to the second fly wheel 8 at the center thereof, which is supported by a bearing (not shown) to be freely rotatable, thereby to rotate therewith as one body. The second fly wheel 8 has a gear 8a which is formed integrally on the periphery thereof and meshes with the relay pulley gear 9, so that the relay pulley gear 9 is driven to rotate by the second fly wheel 8.

Numerals 27 and 28 denote a first pinch roller and a second pinch roller, respectively. During forward reproduction, the first pinch roller 27 is pressed against the first capstan 24 and the second pinch roller 28 is detached from the second capstan 26, while the magnetic tape 20 is fed in the direction of arrow A. During reverse reproduction, the second pinch roller 28 is pressed against the second capstan 26 and the first pinch roller 27 is detached from the first capstan 24, while the magnetic tape 20 is fed in the direction of arrow B.

Numerals 29 and 30 denote a first fast feed gear and a second fast feed gear, respectively, the first fast feed gear 29 being capable of meshing with the drive slip gear 1 and the second fast feed gear 30 being capable of meshing with the first reel relay gear 13 or the second reel relay gear 16. The first fast feed gear 29 and the second fast feed gear 30 are concentrically linked with each other to rotate together as one body, with a fast feed lever 31 interposed therebetween.

Numeral 32 denotes a control lever which can rotate freely around a shaft 33 and has a shaft portion 32a at one end thereof which is engaged with an arc-shaped first groove 31a formed on the fast feed lever 31. An arc-shaped second groove 31b formed on the fast feed lever 31 engages with a shaft 34, so that the fast feed lever 31 can make swinging motion.

The control lever 32 is controlled by a cam (not shown) and other members to put the first fast feed gear 29 and the drive slip gear 1 in mesh with each other during idle state, and make these gears come off each other during reproduction, though such a mechanism is well known and therefore detailed description thereof will be omitted here.

Numeral 35 denotes a play lever which is capable of swinging freely around a shaft 36 and supports, by means of a shaft 35a attached at the tip thereof, the play gear 11 freely rotatably. The play lever 35 is controlled by a cam (not shown) to swing clockwise thereby putting the play gear 11 and the intermediate gear 12 into mesh as shown in FIG. 11 and FIG. 12 during forward reproduction, put the play gear 11 and the second reel relay gear 16 into mesh as shown in FIG. 13 during reverse reproduction, and cause the play gear 11 to come off the intermediate gear 12 and the second reel relay gear 16 during idle period. Such a mechanism is well known and therefore detailed description thereof will be omitted here.

Numeral 37 denotes a magnetic head which enters deep into the tape cassette 19 during reproduction, and enters therein slightly during idle period and in fast feed state.

Operation of the magnetic tape wind-up device for tape recorders made in such a configuration will now be described below.

Operation of forward reproduction will be described first. When the tape recorder is switched from idle state shown in FIG. 10 to forward reproduction mode by a cam (not shown), the first pinch roller 27 is pressed against the first capstan 24 while interposing the magnetic tape 20 therebetween. On the other hand, the second pinch roller 28 is caused to come off the second capstan 26, releasing the magnetic tape 20. At the same time, the play lever 35 is caused to swing clockwise, so that the play gear 11 meshes with the intermediate gear 12. As the motor 6 rotates clockwise, the first capstan 24 rotates counterclockwise and the first pinch roller 27 rotates clockwise, thereby to cause the magnetic tape 20 interposed therebetween to run in the direction of arrow A at a constant speed. The first reel hub 21 rotates counterclockwise. Consequently, the magnetic tape 20 which is fed at a constant speed is wound up by the first reel hub 21, with the tape recorder being put in the state of forward reproduction.

In the state of forward reproduction, the first fast feed gear 29 is detached from the drive slip gear 1.

Now the operation of the reverse reproduction will be described below. When the tape recorder is switched from idle state of FIG. 10 or the state of forward reproduction of FIG. 11 or FIG. 12 to reverse reproduction mode by a cam (not shown), the second pinch roller 28 is pressed against the second capstan 26 as shown in FIG. 13, while interposing the magnetic tape therebetween. On the other hand, the first pinch roller 27 is detached from the first capstan 24 to release the magnetic tape 20. At the same time, the play lever 35 is caused to swing counterclockwise thereby putting the play gear 11 in mesh with the second relay gear 16. As the motor 6 rotates clockwise, the second capstan 26 rotates clockwise and the second pinch roller 28 rotates counterclockwise, thereby to feed the magnetic tape 20 interposed therebetween in the direction of arrow B at a constant speed. The second reel hub 22 rotates clockwise. Consequently, the magnetic tape which is fed at a constant speed is wound up by the second reel hub 22, with the tape recorder being put in the state of reverse reproduction.

In the state of reverse reproduction, the first fast feed gear 29 is detached from the drive slip gear 1.

Figure 10:
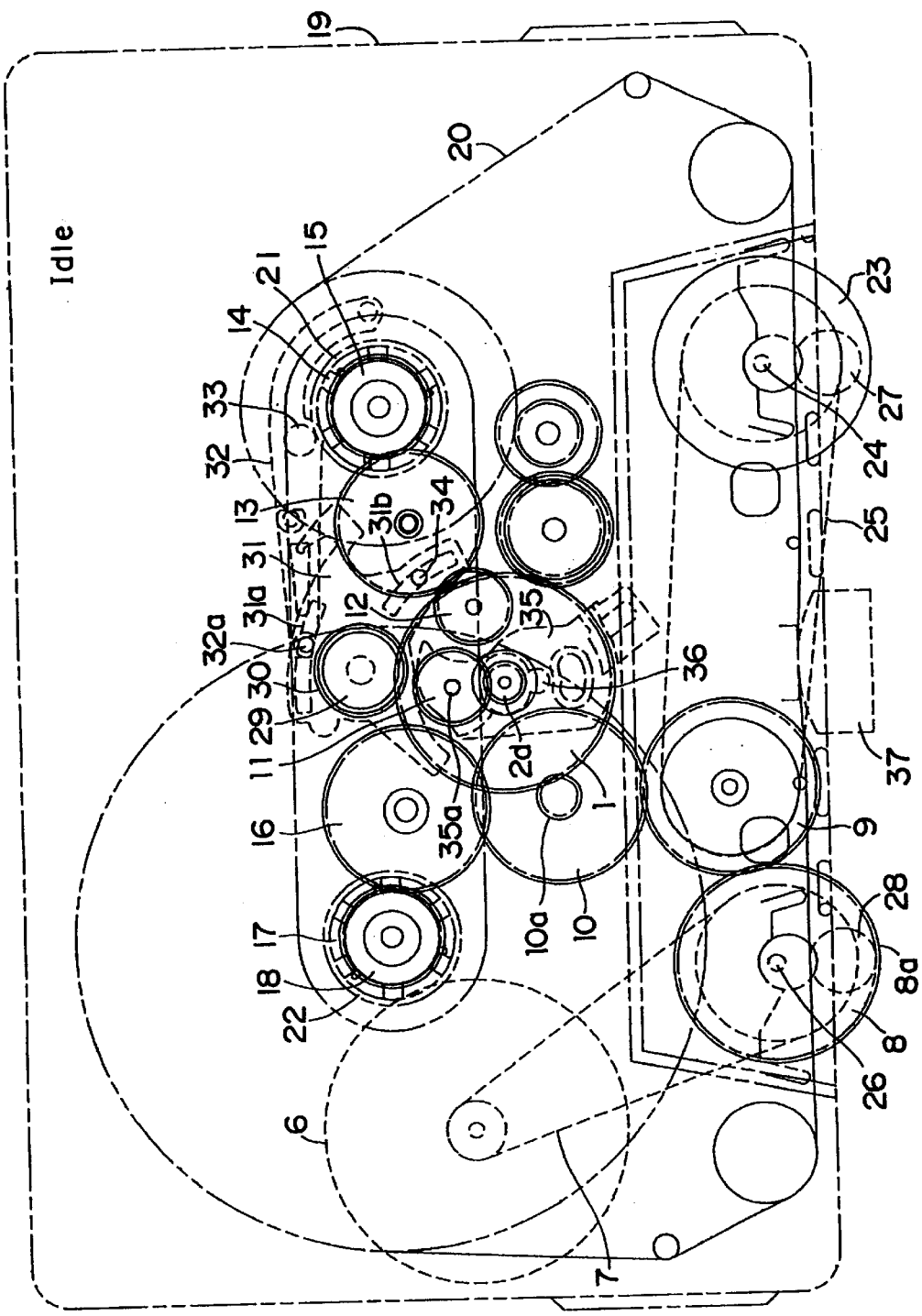
FIG. 10 is a schematic plan view of the tape recorder which employs the magnetic tape wind-up device shown in FIG. 1 in idle state.

Stopping operation will be described below. When the tape recorder is switched from the state of forward reproduction of FIG. 11 or FIG. 12 or the state of reverse reproduction of FIG. 13 to idle mode by a cam (not shown), the first pinch roller 27 or the second pinch roller 28 is detached from the first capstan 24 or the second capstan 26 as shown in FIG. 10, and the play gear 11 is detached from the intermediate gear 12 or the second reel relay gear 16. Further the first fast feed gear 29 meshes with the drive slip gear 1, thereby putting the tape recorder in idle state shown in FIG. 10.

Fast feed operation will be described below. When the motor 6 rotates counterclockwise from idle state shown in FIG. 10, the first fast feed gear 29 and the second fast feed gear 30 rotate counterclockwise. At this time, because the first fast feed gear 29 and the second fast feed gear 30 are under rotational load applied thereto, the fast feed lever 31 is caused to swing clockwise. As a result, the second fast feed gear 30 meshes with the first reel relay gear 13, and accordingly the first reel 15 rotates counterclockwise thereby putting the tape recorder in the state of first fast feed.

Figure 15:
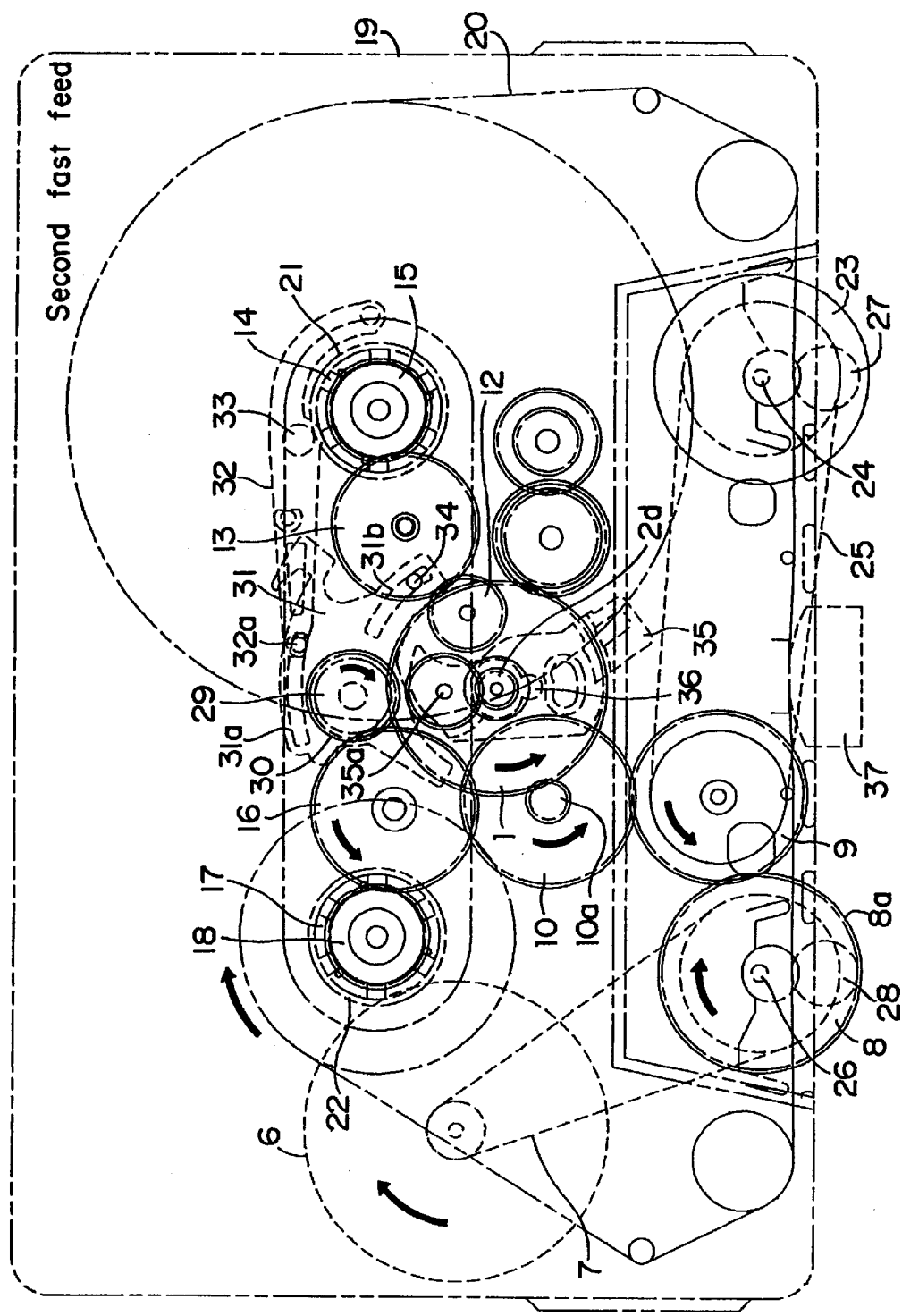
FIG. 15 is a schematic plan view of the tape recorder shown in FIG. 10 in a state of second fast feed operation.

When the motor 6 rotates clockwise from idle state shown in FIG. 10, the first fast feed gear 29 and the second fast feed gear 30 rotate clockwise as shown in FIG. 15. At this time,because the first fast feed gear 29 and the second fast feed gear 30 are under rotational load applied thereto, the fast feed lever 31 is caused to swing counterclockwise. As a result, the second fast feed gear 30 meshes with the second reel relay gear 16, and accordingly the second reel 18 rotates clockwise thereby putting the tape recorder in the state of second fast feed.

According to Embodiment 1, as described above, in the state of forward reproduction and the state of reverse reproduction, the drive slip gear 1 and the driven slip gear 2 slip against each other via the slip member 3, so that rotation (torque) of the drive slip gear 1 is transmitted to the driven slip gear 2 thereby generating slip torque.

Consequently, in such a state shown in FIG. 2 where the drive-side second slipping surface 1c and the driven-side second slipping surface 2c do not overlap each other at all, a constant slip torque is generated by the drive-side first slipping surface 1b and the driven-side first slipping surface 2b. When the apparatus changes gradually from this state to the state shown in FIG. 7 and the drive-side second slipping surface 1c and the driven-side second slipping surface 2c begin to overlap, then the slip torque gradually increases and reaches the maximum level in the state shown in FIG. 5 where the drive-side second slipping surface 1c and the driven-side second slipping surface 2c completely overlap each other. Thereafter, the slip torque gradually decreases until the state shown in FIG. 8 is reached.

Figure 16:
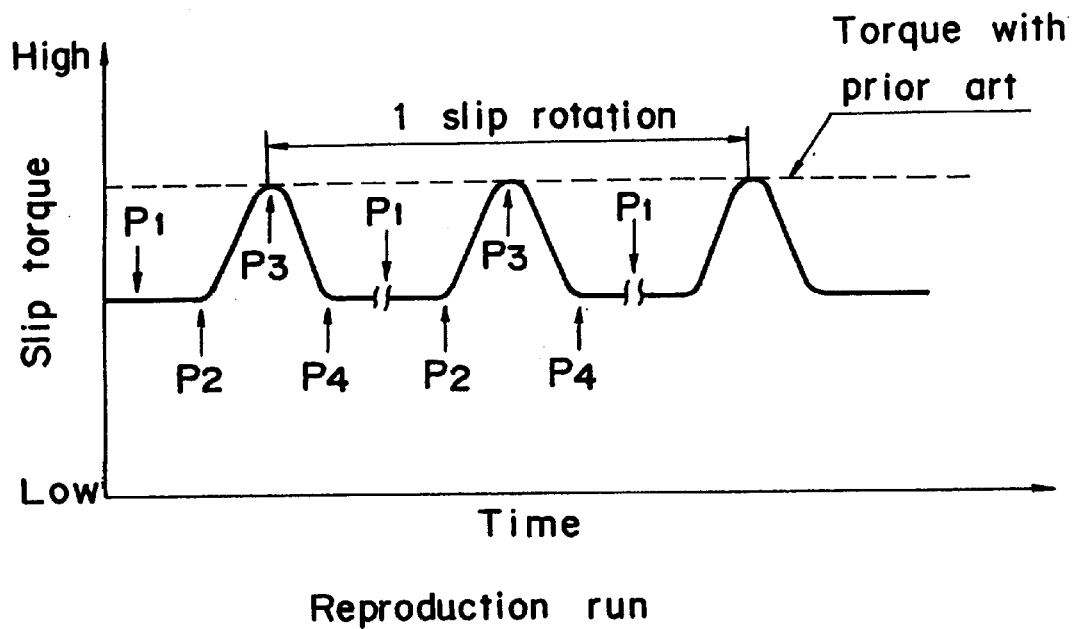
FIG. 16 is a graph showing the characteristic of slip torque changing with time in normal state.

FIG. 16 shows the characteristic of such a change of slip torque with time. In FIG. 16, $P_1$ shows the state of FIG. 2, $P_2$ shows the state of FIG. 7, $P_3$ shows the state of FIG. 5 and $P_4$ shows the state of FIG. 8. As will be clear from FIG. 16, slip torque changes periodically. In this case, maximum value of the slip torque generated when the drive-side second slipping surface 1c and the driven-side second slipping surface 2c overlap each other may be set to the same value as the slip torque (constant value) of the magnetic tape wind-up device of the prior art. Therefore, in the magnetic tape wind-up device of the present invention, the mean slip torque becomes substantially less than the slip torque of the magnetic tape wind-up device of the prior art, making it possible to greatly reduce the power consumption of the motor 6 compared to the prior art. That is, when the drive-side second slipping surface 1c and the driven-side second slipping surface 2c do not overlap each other, because the slip torque decreases accordingly, power consumption of the motor 6 can be reduced compared to the prior art.

Because the drive-side second slipping surface 1c and the driven-side second slipping surface 2c are made in such configurations as the areas thereof gradually decrease toward the outside in the radial direction of the drive slip gear 1 or the driven slip gear 2, sudden changes in the slip torque do not occur. Therefore decrease of performance due to wow or other cause is made very small. Also at the start of winding up when the roll of the magnetic tape 20 wound around the first reel hub 21 is small in diameter as shown in FIG. 11, difference in the rotational speed (slip speed) between the driven slip gear 2 and the drive slip gear 1 is small. On the other hand, at the end of winding when the roll of the magnetic tape 20 wound around the first reel hub 21 is larger in diameter as shown in FIG. 12, difference in the rotational speed (slip speed) between the driven slip gear 2 and the drive slip gear 1 is greater. But the difference in the rotational speed (slip speed) between the driven slip gear 2 and the drive slip gear 1 is smaller when compared to the rotational speed of the drive slip gear 1. As a result, because the slip torque changes slowly, there arises less significant decrease in the performance such as wow caused thereby.

In case the tape recorder is in the state of forward reproduction or reverse reproduction and the first reel 15 or the second reel 18 has stopped rotating due to increasing rotational load on the first reel hub 21 or on the second reel hub 22, slipping speed between the driven slip gear 2 and the drive slip gear 1 becomes equal to the rotational speed of the drive slip gear 1, thereby making the period when the drive-side second slipping surface 1b and the driven-side second slipping surface 2b overlap each other shorter. As a result, the period of time taken for the stop torque to reach the maximum value becomes very short, namely the stop torque reaches the maximum value very quickly. Consequently, the first reel 15 or the second reel 18 is surely driven to rotate by the maximum slip torque, thereby causing the operation of winding up the magnetic tape 20 around the first reel hub 21 or the second reel hub 22 to be done without trouble.

Figure 17:
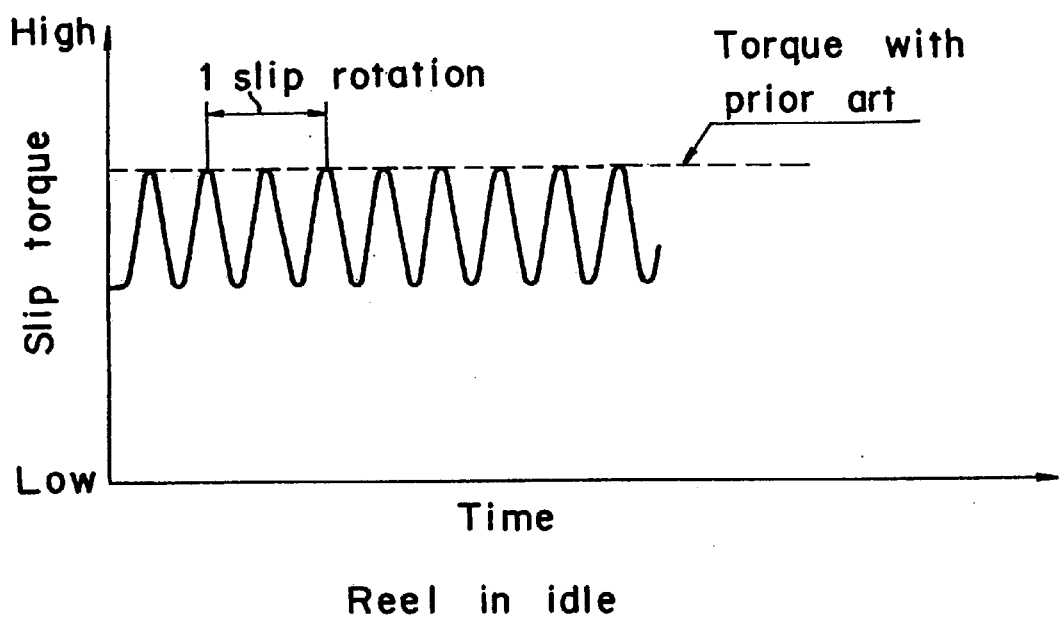
FIG. 17 is a graph showing the characteristic of slip torque changing with time when the reel has stopped.

FIG. 17 shows the characteristic of change in slip torque with time when the first reel 15 or the second reel 18 has stopped rotation.

(Embodiment 2)

Now taking reference to FIG. 18 through FIG. 21, Embodiment 2 will be described below. Basic construction of the magnetic tape wind-up device according to Embodiment 2 is similar to that of the magnetic tape wind-up device according to Embodiment 1 described previously, and therefore description that follows will be focused on the difference from Embodiment 1.

FIG. 18 through FIG. 21 are plan views of key portions of the slip mechanism of the magnetic tape wind-up device according to Embodiment 2.

As shown in FIG. 18 through FIG. 21, the magnetic tape wind-up device according to Embodiment 2 differs from the magnetic tape wind-up device according to Embodiment 1 in that the drive slip gear 1 has a side wall 1d which has a pair of concave cam surfaces 1e formed thereon to surround the periphery of the drive-side first slipping surface 1b, and that a pair of contact portions 2e which engage with the side wall 1d are provided on the periphery of the driven-side first slipping surface 2b. The contact portions 2e are made in spring structures which are elastically charged against the side wall 1d, thereby to make frictional engagement with the side wall 1d when put into contact with the cam surfaces 1e of the side wall 1d. The two cam surfaces 1e are arranged at positions which are centrosymmetrical with respect to the center of rotation of the drive slip gear 1, and the two contact portions 2e are arranged at positions which are centrosymmetrical with respect to the center of rotation of the driven slip gear 2.

In FIG. 18 through FIG. 21, arrow $X_1$ indicates the rotating direction of the drive slip gear 1 and the driven slip gear 2, while arrow Y indicates the central portion of the cam surface 1e, namely the portion where the distance in the radial direction from the center of rotation of the drive slip gear 1 is shortest.

Figure 18:
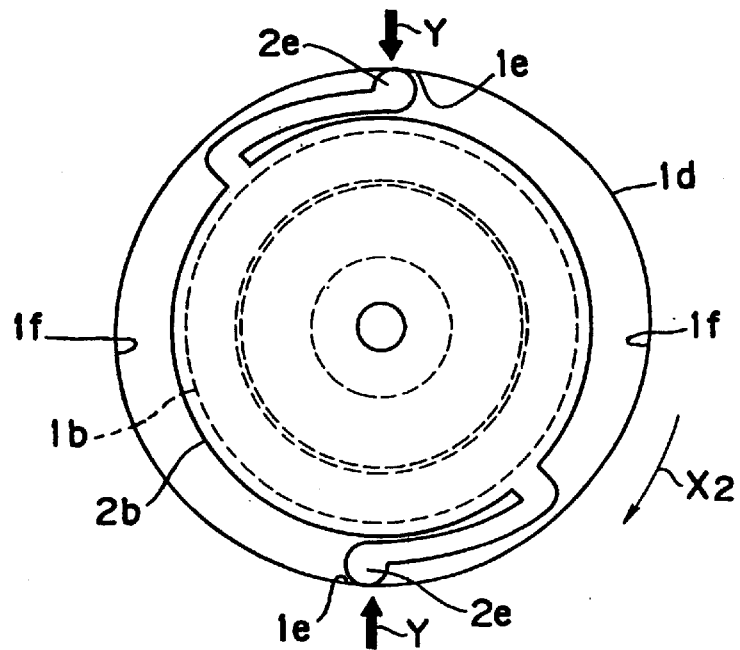
FIG. 18 is a plan view of a key portion of the slip mechanism of the magnetic tape wind-up device according to Embodiment 2 of the present invention, in a state where the contact portion and the cam surface are not in contact with each other.

In the magnetic tape wind-up device according to Embodiment 2, in case operation of forward reproduction or reverse reproduction is carried out similarly to the case of the magnetic tape wind-up device according to Embodiment 1 described previously and the contact portion 2e is engaged with a non-contact portion 1f (non-cam surface) of the side wall 1d of the drive slip gear 1 as shown in FIG. 18, slip torque (constant value) is generated only between the slip member 3 and the drive-side first slipping surface 1b and the driven-side first slipping surface 2b.

Figure 19:
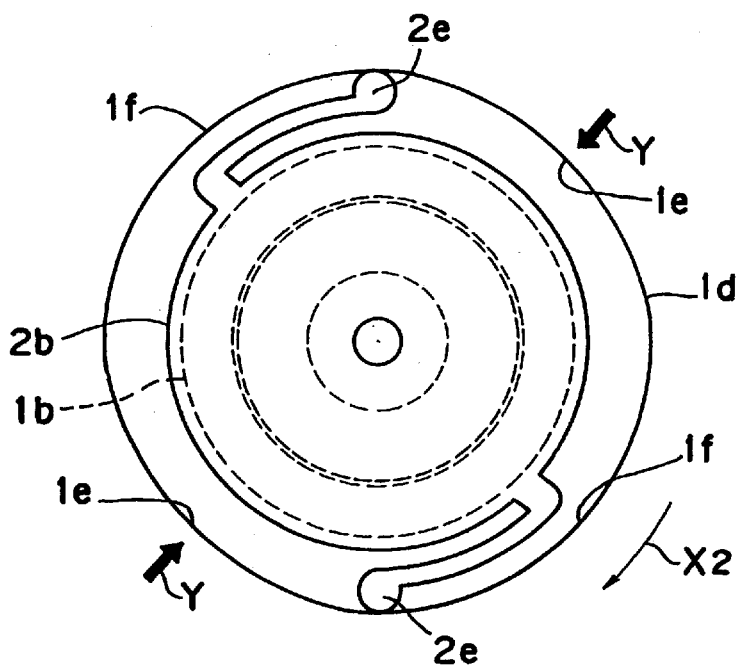
FIG. 19 is a plan view of a key portion of the slip mechanism shown in FIG. 18, in a state where the contact portion and the cam surface begin to make contact with each other.
Figure 20:
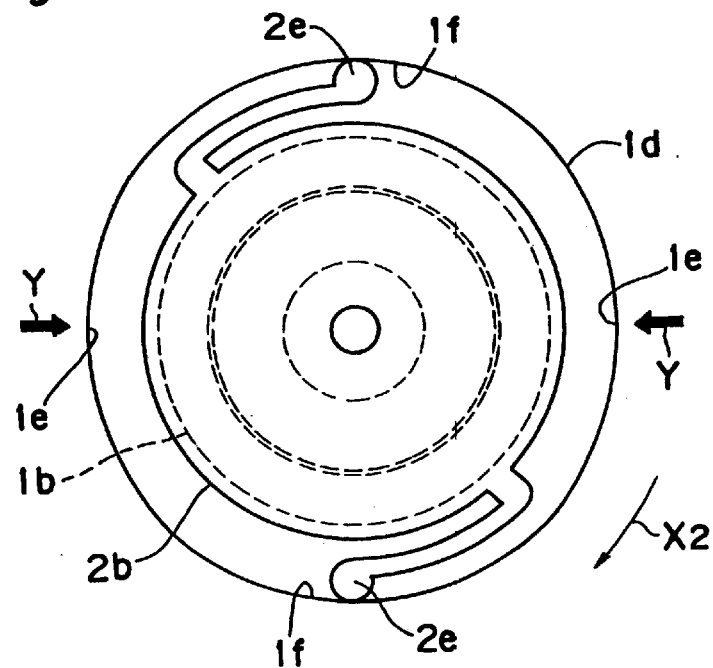
FIG. 20 is a plan view of a key portion of the slip mechanism shown in FIG. 18, in a state where the contact portion and the cam surface are in contact with each other.
Figure 21:
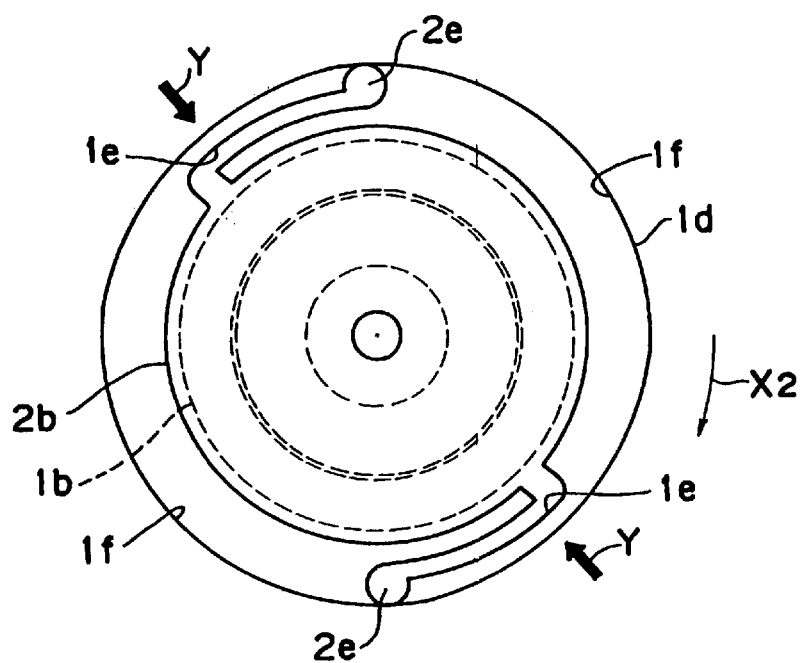
FIG. 21 is a plan view of a key portion of the slip mechanism shown in FIG. 18, in a state where the contact portion and the cam surface end contact with each other.
Figure 22:
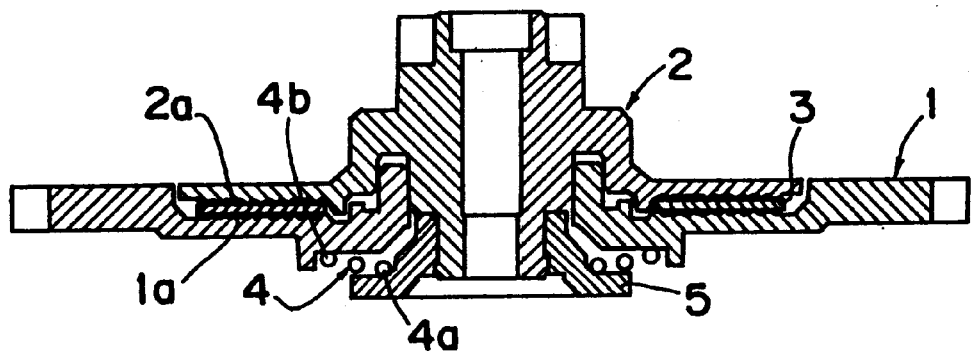
FIG. 22 is a vertical cross sectional view of the slip mechanism of the magnetic tape wind-up device of the prior art.
Figure 23:
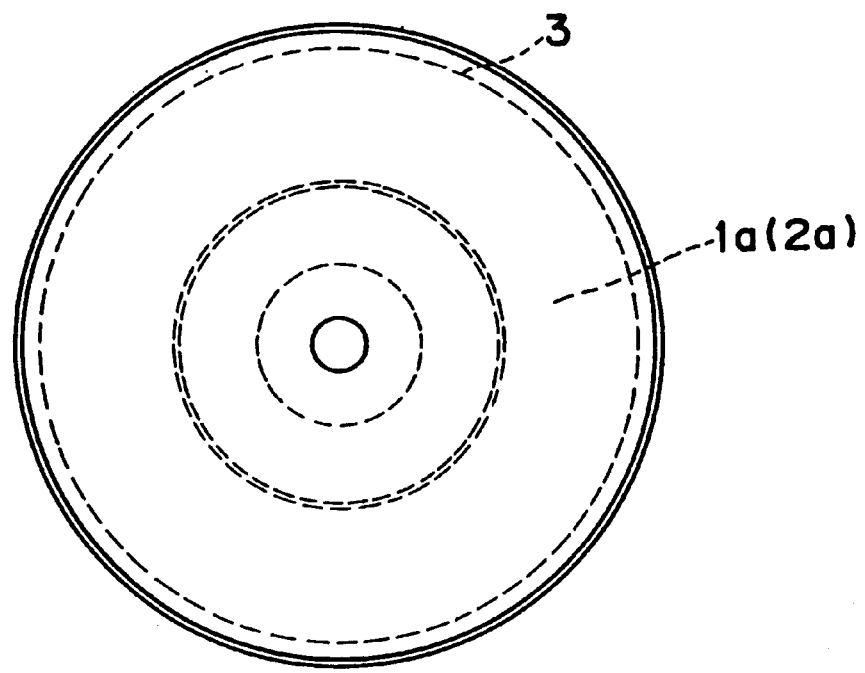
FIG. 23 is a plan view of a key portion of the slip mechanism shown in FIG. 22.

When the apparatus shifts gradually from this state to the state shown in FIG. 19 and the contact portion 2e of the spring mechanism touches the cam surface 1e, slip torque gradually increases due to the contact pressure and reaches the maximum in the state shown in FIG. 20. Then the slip torque gradually decreases until the state shown in FIG. 21 is reached. Because the cam surface 1e is made in such configurations as the distance in the radial direction from the center of rotation gradually changes, sudden changes in the slip torque do not occur. Therefore decrease of performance due to wow or other cause is made very small.

In case the tape recorder is in the state of forward reproduction or reverse reproduction and the first reel 15 or the second reel 18 has stopped rotating due to increasing rotational load on the first reel hub 21 or on the second reel hub 22, slipping speed between the driven slip gear 2 and the drive slip gear 1 becomes equal to the rotational speed of the drive slip gear 1, thereby making the period when the cam surface 1e and the contact portion 2e are in contact with each other shorter. As a result, the period of time taken for the stop torque to reach the maximum value becomes very short, namely the stop torque reaches the maximum value very quickly. Consequently, the first reel 15 or the second reel 18 is surely driven to rotate by the maximum stop torque, causing the operation of winding up the magnetic tape 20 around the first reel hub 21 or the second reel hub 22 to be done without trouble.

In this case, the maximum value of slip torque generated when the cam surface 1e and the contact portion 2e make contact with each other may be set to the same value as the slip torque (constant value) of the magnetic tape wind-up device of the prior art. Therefore, because the cam surface 1e and the contact portion 2e are driven with a less slip torque without making contact with each other, accordingly the power consumption of the motor 6 is reduced compared to the magnetic tape wind-up device of the prior art.

Although the description of Embodiment 1 and Embodiment 2 of the present invention assumes that the second slip portion comprises a pair of parts arranged to be centrosymmetric with respect to the center of rotation, such an arrangement is a mere example and the present invention can be applied to various configurations other than the above, as a matter of course.

Although, the present invention has been described in terms of preferred embodiments, it will be apparent to those of skill in the art that numerous variations and modifications may be made without departing from the true spirit and scope thereof, as set forth in the following claims.

What is claimed is:

1. A magnetic tape wind-up device for winding up magnetic tape which is fed at a constant speed by a capstan and a pinch roller, around a reel, including a slip mechanism, comprising:

a drive member driven by a motor to rotate, said drive member including a first drive section and a second drive section;

a driven member, in frictional engagement with said drive member, which is driven to rotate by torque transmitted by said drive member through frictional engagement with said driven member while slipping against said drive member and which drives said reel to rotate, said driven member having a first driven section and a second driven section;

said first drive section and said first driven section being opposing disk-shaped slipping surfaces coupled by frictional engagement to transmit a constant torque from said drive member to said driven member;

said second drive section and said second driven section being slipping surfaces that extend outwardly from said first drive section and said first driven section, respectively, and narrow along a radial direction, and which are structured such that said second drive section and said second driven section intermittently enter into frictional engagement with each other to intermittently transmit a torque from said drive member to said driven member, such that a total torque transmitted from said drive member to said driven member changes periodically.

2. The magnetic tape wind-up device according to claim 1, wherein, said first drive section is a flat surface;

said second drive section has a plurality of protruding and recessed tracks formed concentrically about a center of rotation of said drive member;

said first driven section has a plurality of protruding and recessed tracks formed concentrically about a center of rotation of said driven member;

said second driven section has a plurality of protruding and recessed tracks formed concentrically about a center of rotation of said driven member, such that said tracks of said second drive section frictionaly engage said tracks of said second driven section;

said protruding tracks of said second drive section have a greater height than said flat surface; and a disk-shaped slip member is interposed between said drive member and said driven member.

3. A magnetic tape wind-up device for winding up magnetic tape which is fed at a constant speed by a capstan and a pinch roller, around a reel, including a slip mechanism, comprising:

a drive member driven by a motor to rotate, said drive member including a first drive section and a second drive section;

a driven member, in frictional engagement with said drive member, which is driven to rotate by torque transmitted by said drive member through frictional engagement with said driven member while slipping against said drive member and which drives said reel to rotate, said driven member having a first driven section and a second driven section;

said first drive section and said first driven section being opposing disk-shaped slipping surfaces coupled by frictional engagement to transmit a constant torque from said drive member to said driven member, said first drive section being a flat surface, said first driven section having a plurality of protruding and recessed tracks formed concentrically about a center of rotation of said driven member;

said second drive section and said second driven section being slipping surfaces that extend outwardly from said first drive section and said second drive section, respectively, and which are structured such that said second drive section and said second driven section intermittently enter into frictional engagement with each other to intermittently transmit a torque from said drive member to said driven member, such that a total torque transmitted from said drive member to said driven member changes periodically;

said second drive section having a plurality of protruding and recessed tracks formed concentrically about a center of rotation of said drive member;

said second driven section having a plurality of protruding and recessed tracks formed concentrically about a center of rotation of said driven member, such that said tracks of said second drive section frictionally engage said tracks of said second driven section;

said protruding tracks of said second drive section having a greater height than said flat surface; and a disk-shaped slip member interposed between said drive member and said driven member.

* * * * *

UNITED STATES PATENT AND TRADEMARK OFFICE
CERTIFICATE OF CORRECTION

PATENT NO. : 6,050,515
DATED : April 18, 2000
INVENTOR(S) : I. SHINOHARA et al.

It is certified that error appears in the above-identified patent and that said Letters Patent is hereby corrected as shown below:

At column 14, line 11 (claim 2, line 13) of the printed patent, "frictionaly" should be ---frictionally---.

Signed and Sealed this

Third Day of April, 2001

Attest:

NICHOLAS P. GODICI

Attesting Officer   Acting Director of the United States Patent and Trademark Office